Patented Mar. 13, 1928.

1,662,462

UNITED STATES PATENT OFFICE.

HUGO L. KLEINHANS, OF NEWARK, NEW JERSEY, ASSIGNOR TO CHARLES COOPER & COMPANY, INC., OF NEWARK, NEW JERSEY, A CORPORATION OF NEW JERSEY.

FUNGICIDE.

No Drawing. Application filed November 1, 1924. Serial No. 747,381.

This invention relates to a fungicide to be used for the elimination of say flag and stinking smut and has for its main object and feature the production of a compound permitting carbonate of copper to be used, without undue expense, as a fungicide and without lessening its value as a fungicide.

Carbonate of copper contains from fifty to fifty-two per cent of metallic copper and is correspondingly high in price making its use as a fungicide practically prohibitive. I have found that its qualities as a fungicide are improved by mixing sulphur with it. Specifically I use flour sulphur.

I have found that by mixing carbonate of copper and sulphur in about the proportion by weight of forty per cent carbonate of copper and sixty per cent sulphur that a one hundred per cent fungicide is produced capable of suspension in water and which at the same time has fertilizing value. Of course the proportions of these ingredients may be varied widely. This mixture contains about twenty per cent copper and is therefore not so expensive as to render its use prohibitive. Furthermore, by using carbonate of copper and sulphur as reciprocal diluents in the manner above stated, I find that not only is the mixture rendered miscible in water, but that while the individual fungicidal properties of each of the ingredients are retained, the carbonate of copper neutralizes in the soil the acid compounds formed by the sulphur.

The compound may be used either as a dry or as a wet spray.

I claim:

A fungicide comprising: a mixture of sulphur and carbonate of copper as reciprocal diluents whereby the said admixture is rendered miscible in water, and said carbonate of copper acting, while each of the ingredients retains its own fungicidal properties, to neutralize in the soil the acid compounds formed by the sulphur.

Signed at New York in the county of New York and State of New York, this 31 day of October, 1924.

HUGO L. KLEINHANS.